Figure 1:
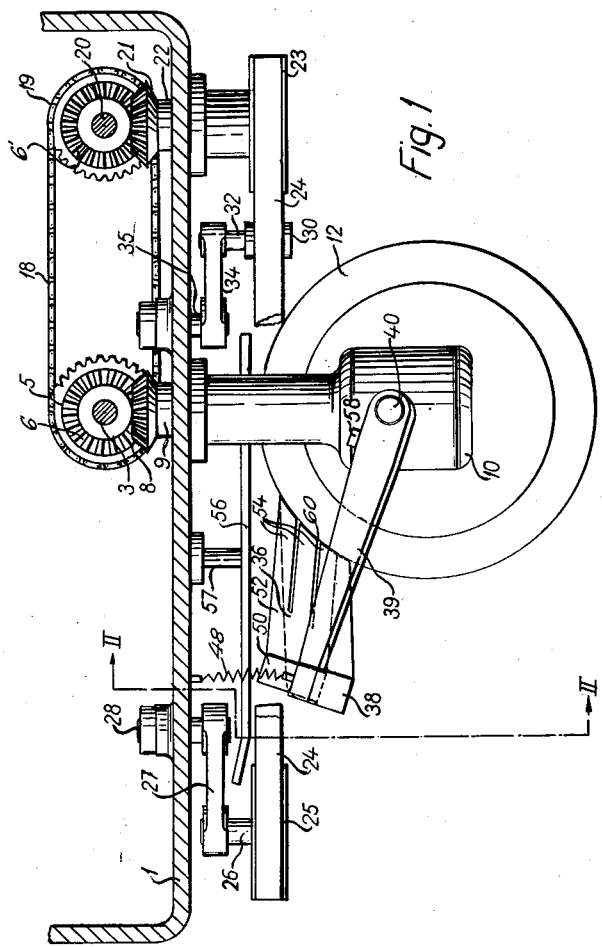

Nov. 26, 1963   P. DANIELSSON   3,111,705
FISH DRESSING MACHINE
Filed April 25, 1960   4 Sheets-Sheet 1

Inventor
Paul Danielsson
by Sommers & Young
Attorneys

Nov. 26, 1963  P. DANIELSSON  3,111,705
FISH DRESSING MACHINE
Filed April 25, 1960  4 Sheets-Sheet 2

Inventor
Paul Danielsson
by Sommers & Young
Attorneys

Inventor
Paul Danielsson
by Sommers & Young
Attorneys

3,111,705
FISH DRESSING MACHINE
Paul Danielsson, Stockholm, Sweden, assignor to Arenco Aktiebolag, Stockholm, Sweden, a Swedish joint-stock company
Filed Apr. 25, 1960, Ser. No. 24,482
Claims priority, application Sweden May 22, 1959
6 Claims. (Cl. 17—4)

This invention relates to a fish dressing machine of the type in which a decapitated fish with opened belly is fed longitudinally along a conveying path over a saddle-shaped carrier, which penetrates into the belly cavity as the fish is pushed over same with its head end forwards and its back at a predetermined level, towards two rotating circular knives for cutting the ribs and the back bone free, which knives are disposed at such inclinations that their edges meet in an upper cutting point between the back of the fish and its back bone.

Such machines, which are provided with a rigid saddle or a saddle consisting of two inclined adjustable saddle plates, as disclosed in the British Patent No. 676,815, are not efficient when dressing fishes of different sizes because the saddle must initially be set to fit fish of a certain size to confine the loss of fish meat to a minimum and to ensure that the bones are completely removed from the body of the fish.

The object of the invention is to provide a saddle-shaped carrier which will automatically be set in dependence on the size of the fish so that bones are completely removed with a minimum loss of valuable parts of the fish.

According to the present invention such a saddle-shaped carrier is comprised of two plates forming with one another substantially the same angle as do the two rotary knives and which plates are each positioned in a plane parallel to and inside the plane of the respective corresponding knife whereby the upper edges of said plates carries the advancing fish. The plates are further mounted on a resilient support mechanism cooperating in such a manner with a control member that the distance between each plane of the plates and the plane of the corresponding knife will be increased, when the plates are pressed downwardly by a fish advancing over the saddle and with its back at a predetermined level.

Because the two plates can thus be moved downwardly relative to the upper cutting point of the knives in dependence on the size of the fish and simultaneously increasing the spacing between each plate plane and the corresponding knife plane it is positively ensured that the knives will cut out all the ribs and the back bone of the fish although the thickness of said bones increases with increasing size of the fish.

Figure 5:
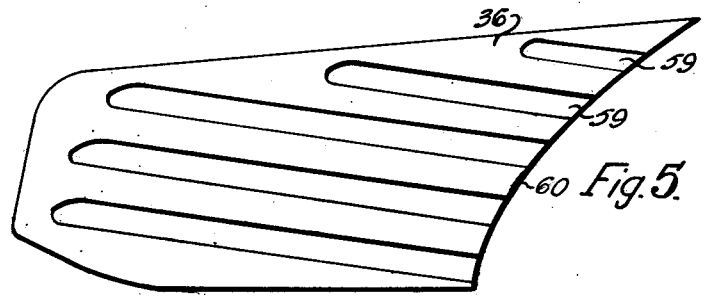
Figure 2:
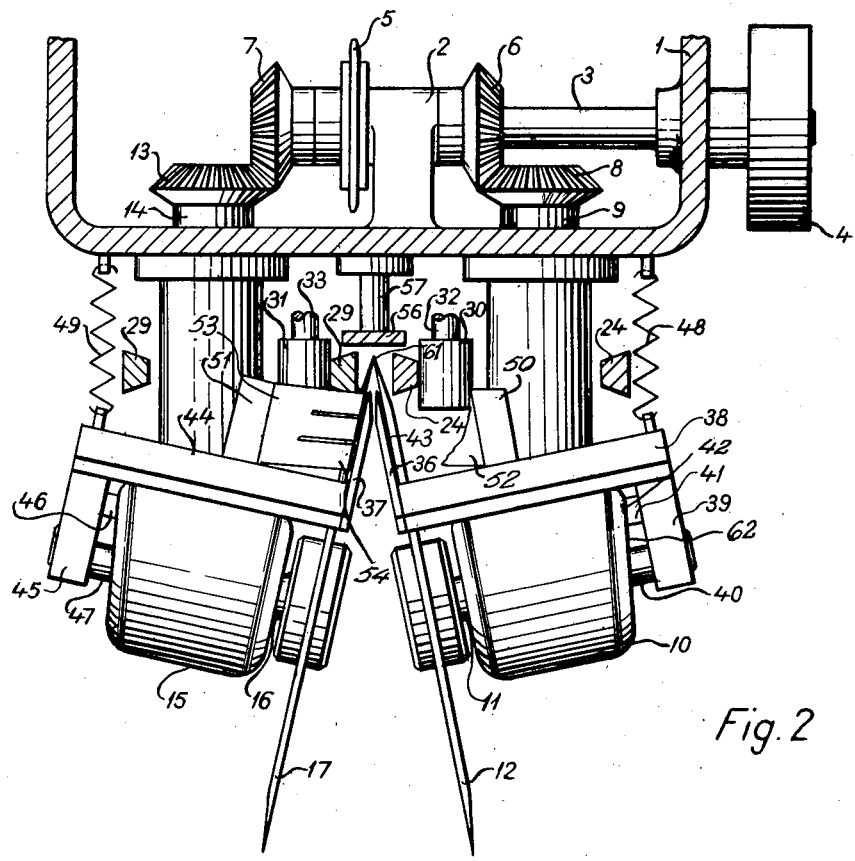
Figure 3:
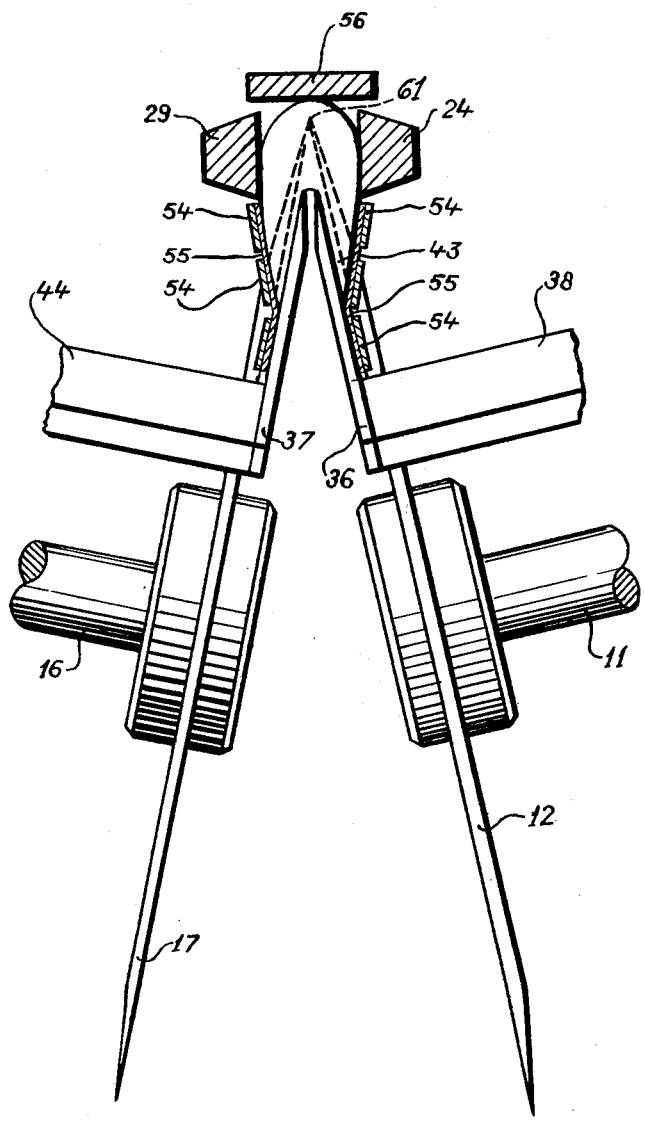
Figure 4:
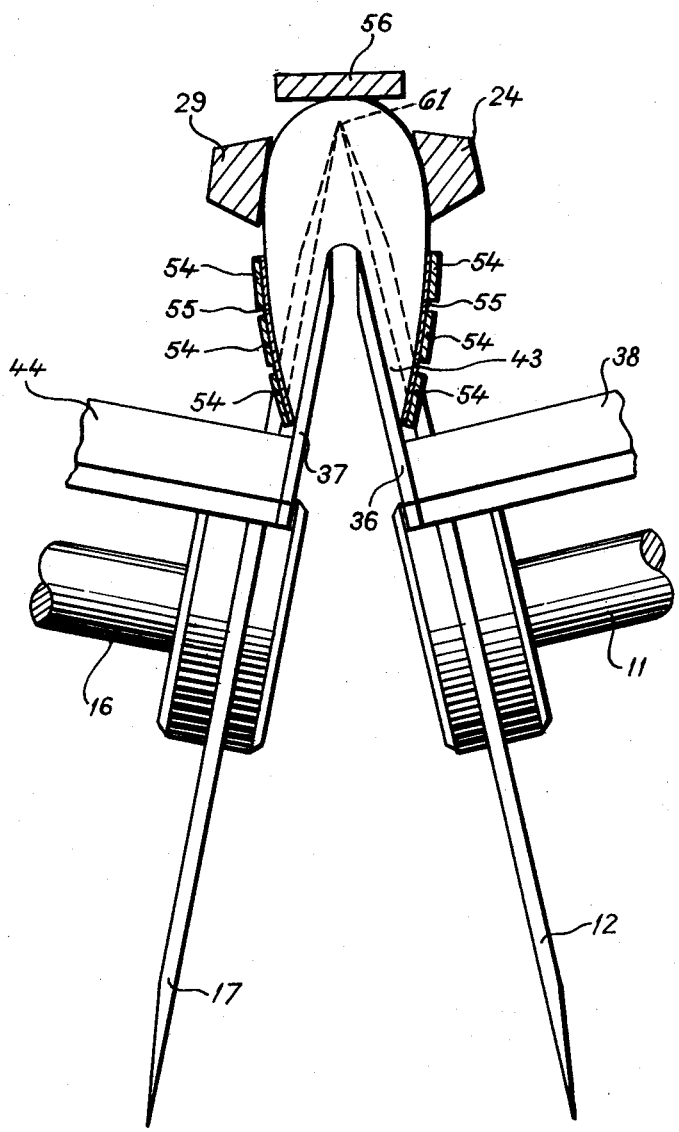

An embodiment of the invention will now be described by way of example with reference to the accompanying drawings, in which:

FIGURE 1 is a side view of the machine with some parts omitted to facilitate the illustration, FIGURE 2 is a sectional view on an enlarged scale taken on the line II—II of FIGURE 1, FIGURE 3 is a detail view on an enlarged scale showing the filleting of a fish, FIGURE 4 is a similar view showing the filleting of a thicker fish, and FIGURE 5 is a view showing a grooved saddle plate.

As shown in FIGURES 1 and 2, a shaft 3 is rotatably journalled in the machine frame 1 and in a bracket 2 secured to the frame 1. The shaft 3 is driven by a belt pulley 4 or another suitable driving means. A sprocket 5 and two bevel gears 6 and 7 are secured to the shaft 3. The bevel gear 6 drives a shaft 11 carrying a circular knife 12 through a bevel gear 8, a shaft 9 and a gearing (not shown) encased in a housing 10. The bevel gear 7 drives a shaft 16 carrying a circular knife 17 through a bevel gear 13, a shaft 14 and a gearing (not shown) encased in a housing 15.

The sprocket wheel 5 is connected by a chain 18 to a sprocket wheel 19, secured to a shaft 20 which also carries a pair of bevel gears one of which is shown at 6', similar to the gears 6 and 7, each of which cooperates with a bevel gear, one of which is shown at 21. The bevel gear 21 drives, through a shaft 22, a pulley 23 associated with an endless belt 24 running over a second pulley 25. The pulley 25 is secured to a shaft 26 which is pivoted to the frame 1 by an arm 27 and a stud 28. The second bevel gear on the shaft 20 drives, through similar means, an endless belt 29. The inner parts of the two belts 24 and 29 are urged towards each other by rollers 30 and 31 which are rotatably mounted on shafts 32 and 33, respectively. The shaft 32 is carried by an arm 34 which is pivoted to a stud 35, and the arm 34 is, for example, acted upon by a spring (not shown) so as to move the roller 30 into contact with the inner part of the belt 24. The shaft 33 is similarly mounted.

Adjacent the two circular knives 12, 17, the planes of which intersect one another in a cutting point 61 and which rotate in the same direction, clockwise or counterclockwise, is a V-shaped carrier or saddle consisting of two elongated saddle plates 36, 37 which incline towards each other correspondingly as the knives 12, 17 do. The trailing edges 60 of the plates 36, 37 turned towards the knives 12, 17 are preferably shaped so as to conform with the circumference of the rotating knives 12, 17 as shown in FIGURE 1. In the embodiment shown the plate 36 is secured to an outwardly projecting arm 38 which, in turn, is secured to an arm 39 perpendicular to the arm 38 and secured to a rotatable and axially displaceable stub axle 40 the centre line of which coincides with the axis of rotation of the shaft 11. To the arm 39 is secured a cam member 41 provided with an inclined cam surface 42, contacting a corresponding cam surface 62 on the fixed housing 10. The cam surface 42, which in the embodiment illustrated is flat, is so inclined relative to the stub axle 40 that said stub axle will be displaced to the left in FIGURE 2, when the arm 39 swings counterclockwise (FIGURE 1) so that the saddle plate 36 will also move to the left in FIGURE 2, thus increasing the spacing 43 between the knife 12 and the plate 36 to ensure that a thicker slice will be cut from the right-hand belly side (FIG. 4) with increasing size of the fish, so that the coarse ribs and back bone of a large fish will be completely removed as well as the comparatively finer bones of a small fish and with a minimum loss of valuable flesh.

The saddle plate 37 is similarly secured to an arm 44 which is secured to a perpendicular arm 45 carrying a cam member with an inclined cam surface 46. The arm 45 is mounted on a rotatable and axially displaceable stub axle 47 which, on the counterclockwise movement of the arm 44 from the position shown in FIGURE 2, moves inwardly due to the sliding movement of the cam member 46 on a cam surface of the housing 16 so that the saddle plate 37 moves from knife 17, thus, increasing the space between knife 12 and plate 36 to increase the thickness of the slice cut out from the left-hand belly side in FIG. 4 with increasing size of this fish.

The movement of the two saddle plates 36, 37 away from the knives 12, 17 when the plates are depressed downwardly, as will be described later on, may obviously be attained in other ways, for example by having the plates or support members, carrying the plates sliding in grooves of such a shape that the movement of the plates along the peripheries of the knives and in the axial direction of the respective knife will be performed.

The arms 38 and 44 shown could, obviously, be removed and the arms 39, 45 be mounted on the inner side of the respective gear housing 10, 15 or mounted on separate brackets on the machine frame as already described.

The two saddle plates 36, 37 are held in an upper position because the arms 38 and 44 are drawn upwardly by a tension spring 48 and 49, respectively (FIGURE 2). The tension spring 48 is provided between the arm 38 and the frame 1 and the tension spring 49 between the arm 44 and the frame 1.

Each arm 38 and 44 also carries a stud 50 and 51, respectively. To each stud 50, 51 is secured a press plate 52 and 53, respectively, with resilient fingers 54. Said fingers 54, which are of known type, rest against the respective saddle plate 36, 37 and adjacent the knife edges and serve to press the sides of the fish against the saddle plates, as shown in FIGURES 3 and 4. To prevent entrails or portions of the sides of the fish being caught by the slits between the fingers 54 of the press plates 52, 53 a very thin sheet of metal 55 or the like is provided between the fingers and the respective saddle plate 36, 37, as shown in FIGURES 3 and 4.

Above the knives 12, 17 and the saddle plates 36, 37 is a guide bar 56 secured to the frame 1 by a stud 57 which bar serves as a stop member for the back of the fish advanced between the belts 24, 29 so that the body of the fish cannot be moved upwardly by the saddle-shaped carrier.

The machine as described operates in the following manner.

When a fish with opened belly and its head cut off in known manner is fed in from the left in FIGURE 1 and caught by the belts 24, 29 (see FIGURES 3 and 4) it will be advanced by the belts over the saddle plates 36, 37 at such a level that its back contacts the guide bar 56. As already mentioned the saddle plates are held in an upper position by the spring 48, 49, said position being determined by stop members 58 acting upon the arms 39, 45. Said upper position corresponds to the size of the smallest fish which is supposed to be treated and freed from bones. If the advancing fish is larger, which means that the distance between the back of the fish, resting against the guide bar 56, and the under side of the back bone, resting on the upper guide edges of the saddle plates 36, 37 exceeds the distance between the guide bar 56 and said guide edges when the saddle plates are in their upper position, the saddle plates 36, 37 will be urged downwardly. The two arms 38 and 44 will thus swing counterclockwise, causing the stub axles 40 and 47 to move axially towards the knives 12 and 17, respectively, so that the saddle plates 36, 37 simultaneously will move away from their respective knives 12 and 17 increasing the space 43 between each plate and the associated knife. This results in that the knives 12, 17, as is clear when comparing FIGURE 3 with FIGURE 4, will cut thicker slices from the belly walls urged against the saddle plates 36, 37 by the fingers 54 the larger the fish is, thereby ensuring that the rib bones and the back bone are removed without losing valuable parts of the fish. Since the axes of the stub axles 40 and 47 coincide with the axes of the shafts 11 and 16, respectively, the edges of the saddle plates 36, 37 adjacent the knife edges will always be positioned at a constant radial distance from the shafts 11, 16 of the knives 12, 17.

In some cases it has turned out that the belly walls of the fish are so thin or weak that, inter alia by friction forces provided by the knives, they will be brought upwardly and be crumpled or slip over the upper edges of the plates 36, 37 thus causing said portions to be cut through or not entirely freed from rib bones.

By providing the outer side of each saddle plate with grooves 59 the belly walls will be properly held. The grooves can be parallel to the fish feeding direction or preferably inclined downwardly towards the knives, as shown in FIGURE 5, to obtain a good guiding force.

The grooves 59 could be replaced by longitudinally extending ridges which will be pressed into the belly side portions of the fish adjacent the cutting edges of the respective knives 12, 17.

The grooves 59 or ridges can extend over the entire length of each saddle plate, as shown in FIGURE 5, but can, of course be shortened, but terminate at the edge of each plate adjacent the respective knife.

The support mechanism of the two saddle plates 36, 37 can be modified in various ways within the scope of the invention and the conveyor belts shown which catch the fish body laterally can be replaced by a single belt of known type provided with gripping means which catch the fish at its back.

What I claim is:

1. In a fish dressing machine of the type in which a fish with opened belly is advanced longitudinally along a conveying path with its head end in the conveying direction, in combination, a machine frame, two disc knives rotatably mounted in said frame and extending at an acute angle to one another such that their edges meet in a cutting point, a fixed fish-back guide engaging the back of an advancing fish so as to maintain the back of the fish at a constant level with respect to said cutting point, a V-shaped fish guiding carrier engaging inside the opened belly of an advancing fish, said fish guiding carrier comprising two separate plates which form with one another an angle substantially equal to the angle between said two disc knives and are each positioned in a plane parallel to the plane of a corresponding one of said disc knives and located inside the acute angle formed by said knives, forming a spacing between each plate-plane and the corresponding knife plane which spacing determines the thickness of the slice cut out inside the fish by the respective knife, a movably mounted support for each of said plates allowing the plates to move away from said fish-back guide the more the greater the thickness of the advancing fish and to move towards the said fish-back guide, and control means operably connected with said movably mounted plate supports to adjust same such that each of said plates moves away from its adjacent knife to uniformly increase the corresponding spacing during the movement of the plate supports to displace the plates away from said fish-back guide and such that each of said plates moves towards its adjacent knife to uniformly decrease the corresponding spacing during the movement of the plate supports to displace the plate toward the said fish-back guide, whereby the said spacings and, thus, the slices cut from the fish vary with the thickness of the fish as determined by the movement of the plate supports.

2. A fish dressing machine as claimed in claim 1, and in which said plates each has a trailing edge which is close to the respective adjacent knife edge and has a radius of curvature corresponding to the radius of said respective knife.

3. A fish dressing machine as claimed in claim 1, and in which said plate-support comprises an arm pivoted to a fixed point on said machine with its one end and carrying a plate on its other end, the pivotal axis of each arm coinciding with the axis of rotation of the corresponding adjacent knife and each of said arms being mounted for movement along its pivot axis.

4. A fish dressing machine as claimed in claim 3, and in which each of said arms is provided with a cam surface, two cam surfaces fixed to the machine and, engaged by said cam surfaces on said arms respectively, said cam surfaces being so inclined relative to the pivotal axis of the associated arm that the arm, on movement of the plates away from said fish-back guide will be displaced along its pivotal axis to increase the spacing between corresponding plate-plane and adjacent knife-plane.

5. A fish dressing machine as claimed in claim 1, and in which the outer side of each plate is provided with longitudinal grooves preventing the sides of the fish from sliding transversely to the feeding direction on the plates.

6. A fish dressing machine as claimed in claim 5, and in which the grooves are inclined toward and terminate at the trailing edges of said plates.

References Cited in the file of this patent

UNITED STATES PATENTS

| | | |
|---|---|---|
| 2,325,680 | Hunt | Aug. 3, 1943 |
| 2,669,746 | Baader | Feb. 23, 1954 |